United States Patent [19]

Robinson

[11] 4,436,536

[45] Mar. 13, 1984

[54] DUST COLLECTING FILTER CARTRIDGE AND ATTACHMENT STRUCTURE FOR SUSPENDING SAME FROM BAGHOUSE TUBE SHEET

[75] Inventor: James W. Robinson, Woodridge, Ill.

[73] Assignee: Flex-Kleen Corporation, Chicago, Ill.

[21] Appl. No.: 428,324

[22] Filed: Sep. 29, 1982

[51] Int. Cl.³ .............................................. B01D 46/52
[52] U.S. Cl. ................................... 55/341 R; 55/379; 55/498; 55/502; 55/507; 55/509; 55/302
[58] Field of Search ............. 55/302, 341 R, 374–379, 55/498, 502, 507, 509, 510; 210/323.2, 451, 452; 285/239, DIG. 22

[56] References Cited

U.S. PATENT DOCUMENTS

| | | | |
|---|---|---|---|
| 4,073,632 | 2/1978 | Reinauer et al. | 55/374 |
| 4,218,227 | 8/1980 | Frey | 55/302 |
| 4,256,473 | 3/1981 | DeMartino | 55/379 |
| 4,276,069 | 6/1981 | Miller | 55/379 |
| 4,291,904 | 9/1981 | Iversen et al. | 55/378 |
| 4,292,057 | 9/1981 | Ulvestad et al. | 55/379 |
| 4,319,897 | 3/1982 | Labadie | 55/302 |
| 4,322,231 | 3/1982 | Hilzendeber et al. | 55/378 |

*Primary Examiner*—David L. Lacey
*Attorney, Agent, or Firm*—Paul & Paul

[57] ABSTRACT

In a reverse-air dust collector, each of a plurality of small-diameter filter cartridges is suspended from the baghouse tube sheet in registry with one of the tube-sheet openings by a cap adhesively secured to the filter cartridge and a collar having a shoulder adhesively attached to the cap. The collar has an outwardly flared rim and a depending annular portion which is press fitted into a double-beaded outwardly-spring-biased fabric cuff which is positioned between the depending collar portion and the edge of the opening in said tube sheet. The upper bead of the cuff rests on and is supported by the tube sheet. The rim of the collar rests on and is supported by the cuff.

3 Claims, 4 Drawing Figures

DUST COLLECTING FILTER CARTRIDGE AND ATTACHMENT STRUCTURE FOR SUSPENDING SAME FROM BAGHOUSE TUBE SHEET

BACKGROUND OF THE INVENTION

This invention relates to a filter media for apparatus for commercial or industrial use in removing particulate matter, such as dust, from a stream of gas, such as air, by cartridge filtration.

In dust filtering apparatus, a baghouse is used which, in the prior art, usually houses an array of cylindrical filter bags suspended from a tube sheet. However, in some prior art installations, an array of filter cartridges, instead of filter bags, have been used.

A dust filter bag is a tubular bag of cylindrical cross section, usually made of fabric which permits passage of air therethrough into the interior of the bag but obstructs passage of dust therethrough. The dust collects on the outer surface of the fabric and from time to time is removed, as by a blast of reverse air.

A filter cartridge, as distinguished from a filter bag, includes an inner perforated tubular sleeve or tube, usually of metal, which is surrounded by an annular filter media, usually of paper, for example, resin impregnated paper. In the prior art, the paper filter media has been pleated for the purpose of increasing the total surface area of the media and to permit the cartridge to be of shorter length than would otherwise be required.

The filter bags or filter cartridges, as the case may be, are suspended in a baghouse which is divided into two sections, a lower dust-laden air chamber, and an upper clean-air chamber. The two chambers are separated by a tube sheet having rows of spaced holes, each of which is in registry with one of the filter bags or filter cartridges. The dust-laden air is blown or drawn upwardly and passes through the wall of the filter bag or cartridge into the interior thereof. The dust does not pass through and collects on the outer surface of the fabric of the filter bag or on the outer surface of the pleated paper media of the cartridge. The dust-free air continues on, upwardly through the open mouths of the bags or cartridges through the holes in the tube sheet and into the upper or clean-air chamber.

Over a period of time, the collection of dust on the outer surface of the bag or cartridge, unless removed, would impede, and eventually prevent, flow of air through the wall and into the interior of the filter bag or cartridge.

The prior art has provided methods for removing the accumulation of dust from the outer wall. Pressurized air is blown in a reverse direction through the bag or cartridge. This is done by injecting a blast of air under pressure into the mouth of the bag to cause it to flow downwardly and outwardly through the fabric or paper wall, thereby to dislodge the dust accumulated on the outer surface of the wall and cause it to fall into a receptacle at the bottom of the lower chamber of the baghouse. A venturi is used to amplify the reverse air.

The prior art has also provided a pneumatic pulse jet system which provides continuous automatic cleaning of the baghouse but cleans only one row of bags or cartridges at a time. Using a timed cycle, a burst of compressed air is directed down through the venturi at the top of each bag in a single row. This induces clean air into the bag setting up a pneumatic shock wave inside. The air flow upwardly through the bag is momentarily stopped and the bag is flexed outwardly, causing accumulated dust particles to drop off into the collector hopper. Since only one row of bags is subjected to the blast of compressed air at a time, there is no interruption of air flow upwardly through the other filter bags or cartridges. This system provides a smooth operating dust control or material handline system.

Prior art filter cartridge systems have been capable of filtering relatively small concentrations of dust or fumes from slow moving air stream, but have not been capable of filtering large concentrations of dust from fast moving air streams. The reason for the inability of the prior art filter cartridge system to handle fast moving air streams carrying large concentrations of dust is the fact that the prior art system has used large diameter cartridge elements having a large number of deep closely-spaced pleats forming a large number of small-angled dust-collecting pockets. The dust becomes so lodged in the deep small-angle pockets that it cannot be effectively removed by the reverse jet air blast. This reduces the effective area of the filter media and has forced the prior art cartridges to have large areas of filter media for each cartridge element. Such large filter elements, when laden with dust become heavy and filter element replacement is made more difficult.

The efficiency and effectiveness of the filter cartridge can be increased by using a cartridge of relatively small diameter with filter media having a relatively small number of pleats of relatively short length, but substantially wider dust angles.

An important advantage of the small-diameter filter cartridge is that it may be installed in existing baghouses to replace the closely spaced filter bags now contained in such baghouses. As described previously herein, a typical filter bag has a diameter of about six inches. In contrast thereto, many prior art filter cartridges have an outside diameter of the order of twelve inches and thus cannot be used to replace filter bags in existing baghouses. Such baghouses may have as many as 500 filter bags in closely spaced rows and, it is an important practical advantage to be able to replace each small-diameter filter bag with a filter cartridge without having to replace the tube sheet.

The present application describes and claims mechanical attachment structure adapted for installing the small-diameter filter cartridge in baghouses, including existing baghouses in which the filter elements are closely spaced filter bags.

As used in the claims, the term "small-diameter filter cartridge" means a filter cartridge having a diameter of the order of six inches.

DETAILED DESCRIPTION OF THE PREFERRED EMBODIMENTS

Figure 1:
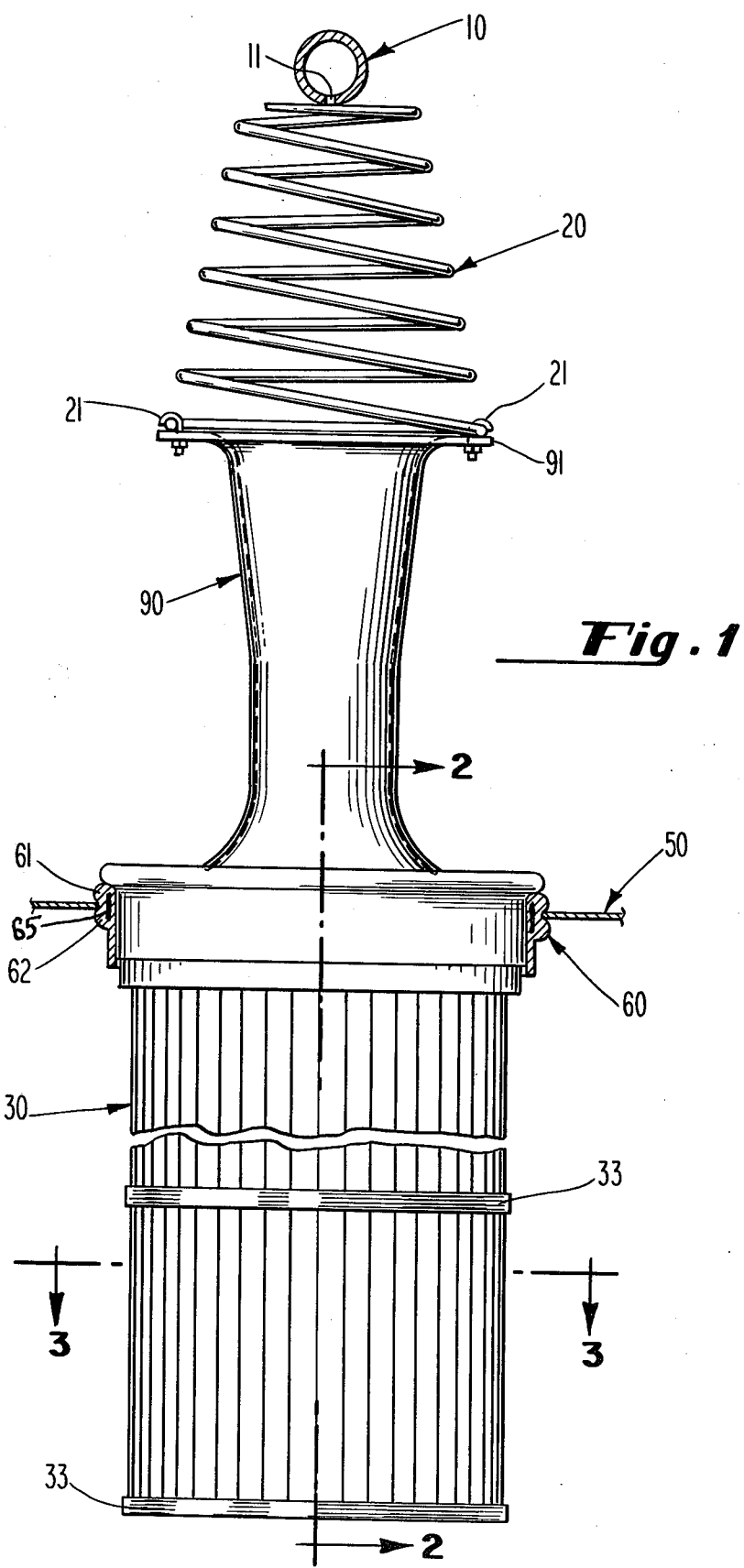
FIG. 1 is an elevational view of an attachment structure for installing and removing the small-diameter filter cartridge where the maintenance man has access to the upper chamber of the baghouse.
Figure 2:
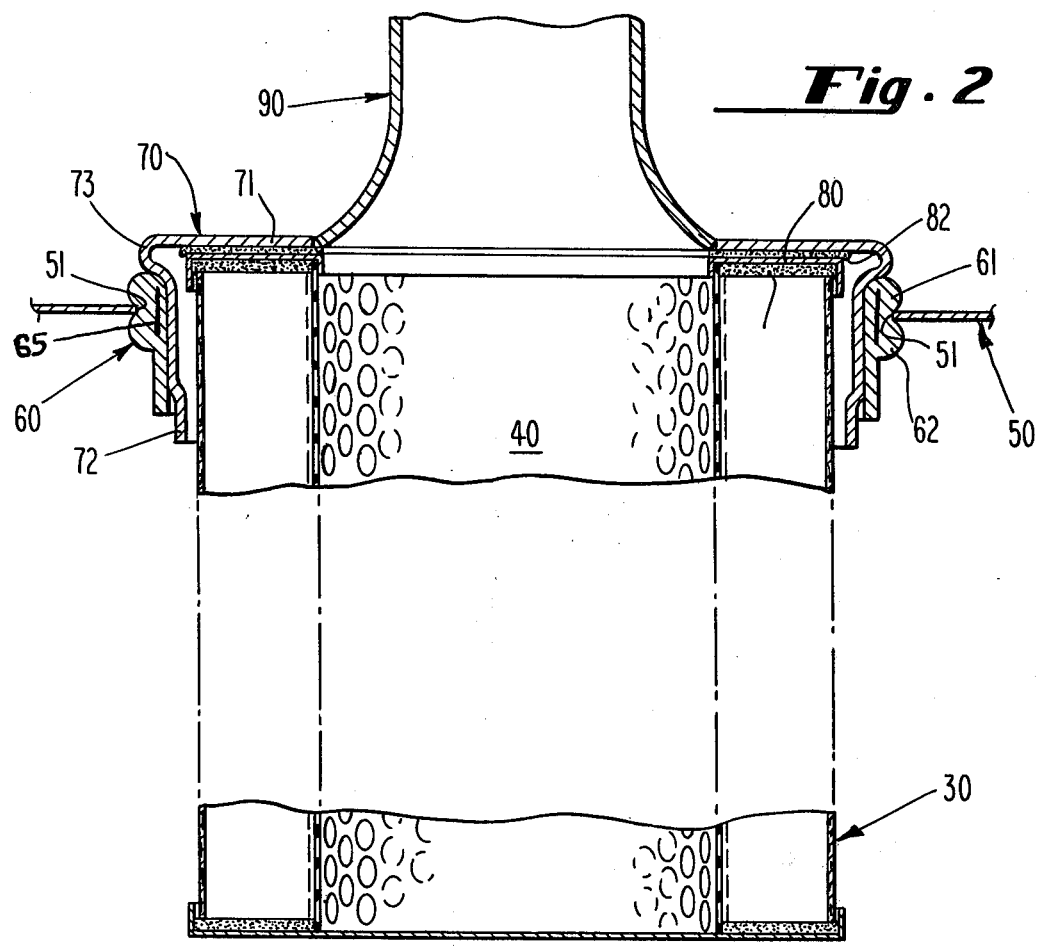
FIG. 2 is a view in section looking along the line 2—2 of FIG. 1.
Figure 3:
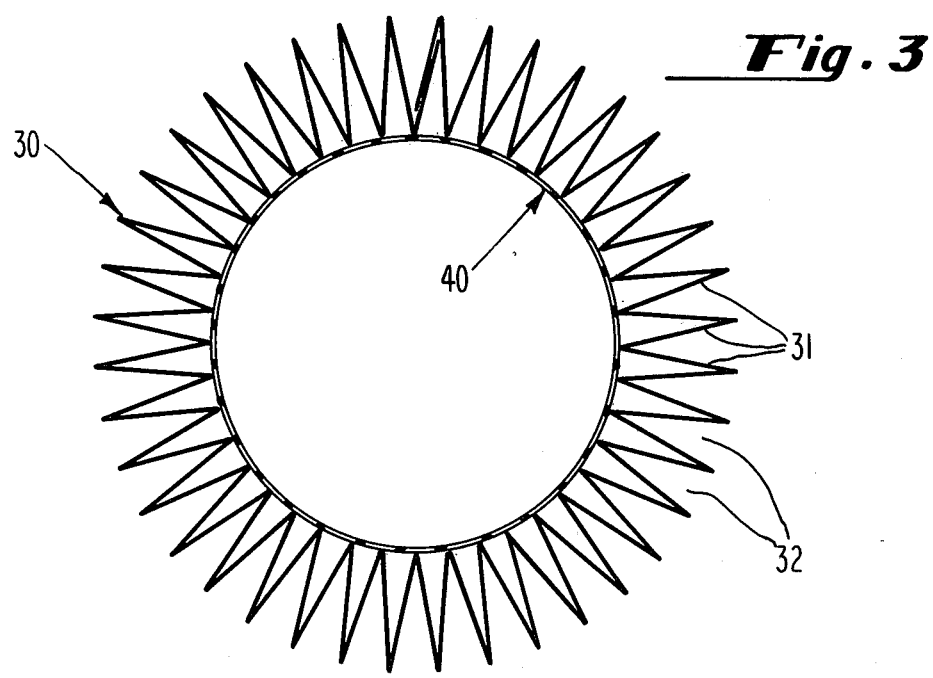
FIG. 3 is a view looking down along the line 3—3 of FIG. 1.

Referring now to FIGS. 1 and 2, there is shown a perforated metal cylindrical sleeve 40 having thereabout an annular filter media 30. The filter media 30, which may preferably be resin impregnated paper, is pleated, as shown in FIG. 3, the pleats 31 forming pockets 32 in which the dust is collected. Embracing the pleated filter media 30 are a pair of retaining bands 33.

Affixed, as by glue, to the upper end of the annular filter media 30 is an annular cap 80, and affixed as by glue 82, to the upper surface of cap 80 is the horizontal annular shoulder portion 71 of a collar 70 which is formed to have an outwardly flared rim 73 and a depending vertical portion 72.

Positioned between depending portion 72 of collar 70 and tube sheet 50 is a gasket cuff 60.

The gasket cuff 60 is of a known type which is illustrated and described in U.S. Pat. No. 4,292,057 issued Sept. 29, 1981 to Edward A. Ulvestad et al and assigned to Flex-Kleen Corporation, the assignee of the present application. Cuff 60 contains an internal band spring 65 of stainless steel or other suitable material, which imposes a radially outward force on cuff 60. Cuff 60 has a double bead configuration, having an upper bead 61 and a lower bead 62 forming therebetween an external annular notch adapted to receive the circular edge of the opening 51 in tube sheet 50. Cuff 60 has a fabric filling, so that the cuff provides a relatively stable resiliently-biased compressible double bead fabric seal that conforms to the tube sheet edge at the hole in the tube sheet, thereby to give a fabric-to-tube sheet seal.

The outwardly-flared rim portion 73 of collar 70 rests on and is supported by the upper bead 61 which in turn is supported by the tube sheet 50. The weight of the suspended filter cartridge comprising the pleated filter media 30 and the perforated cylindrical metal sleeve 40 is carried by the shoulder portion 71 of collar 70. The depending portion 72 of collar 70 is press fitted into bead cuff 60 and, as a result, a good dust seal is effected between the upper larger-diameter portion of depending collar portion 72 and cuff 60.

In FIGS. 1 and 2, a venturi or nozzle 90 is supported on cap 80 and projects thereabove, terminating in a flange 91. A conical compression spring 20 is secured, as by J-hooks 21, to the flange 91 and projects thereabove. The upper ring of the conical compression spring 20 abuts against the undersurface of a longitudinally-extending blow pipe 10 having a hole 11 therein through which a jet of air is emitted during the reverse-air cleaning period.

To remove the filter cartridge for repair or replacement, the assembly comprising the conical compression spring 20 and the venturi nozzle 90 is first removed by compressing the spring 20. Then, the blow pipe is removed. Then the maintenance man removes the filter cartridge by pulling upwardly on the collar 70 until the bottom of the filter cartridge clears the gasket cuff 60.

To replace the filter cartridge, the maintenance man lowers the filter cartridge through the tube sheet hole 51 and press fits the annular depending portion 72 of collar 70 against the double-bead cuff 60 until the rim 73 engages the upper bead 61. He then replaces the blow pipe 10, and finally the venturi and spring assembly.

Figure 4:
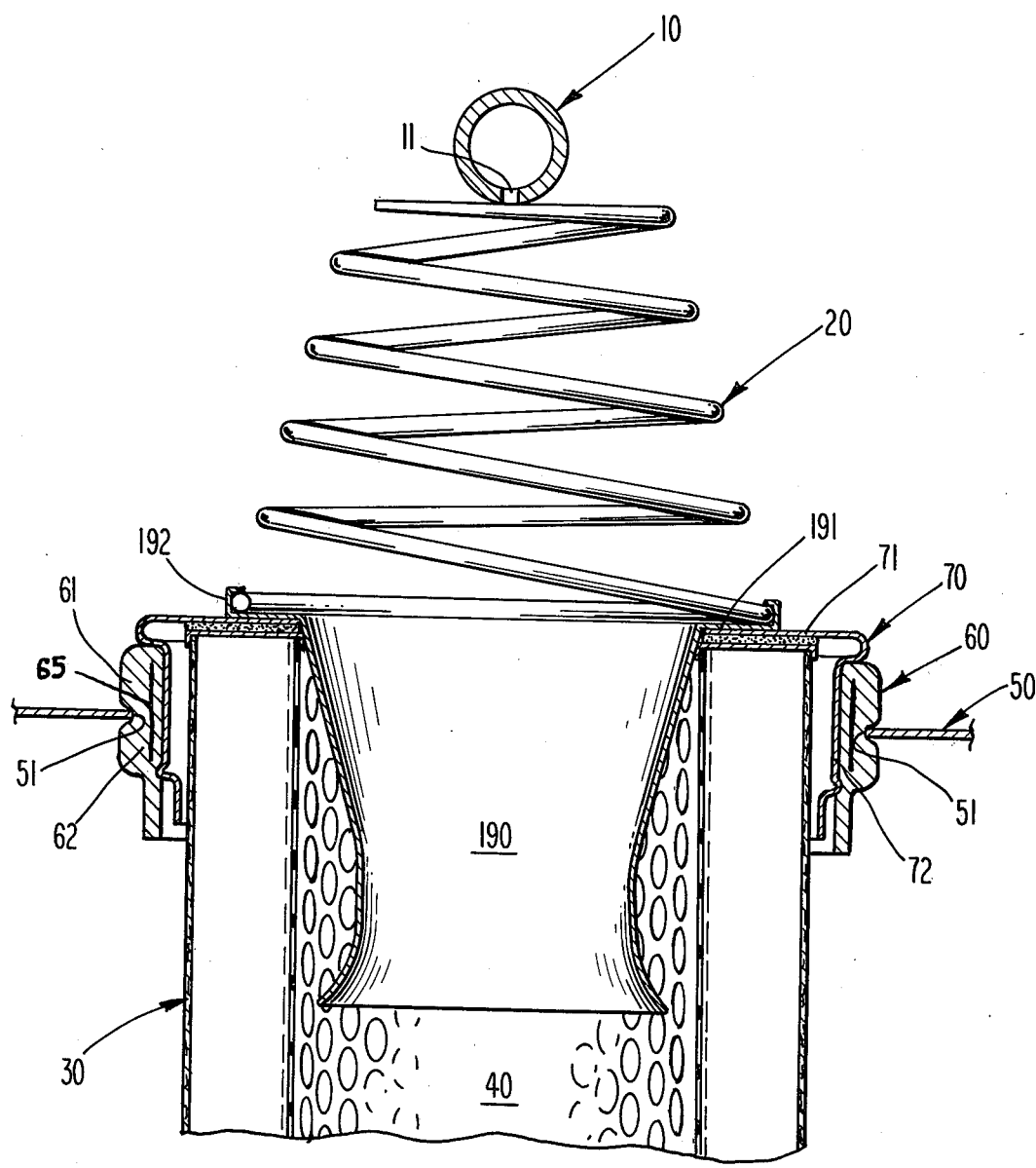
FIG. 4 is an elevational view, partly in section, of an attachment means which is generally similar to that of FIG. 1 but in which the venturi tube is installed within the sleeve of the filter cartridge.

In FIG. 4, the attachment means for supporting the filter cartridge is substantially the same as that shown in FIG. 1-3. The principal difference between the installation shown in FIG. 4 and the installation illustrated in FIGS. 1-3 is that in FIG. 4 the venturi nozzle 190 is supported within the sleeve 40 of the filter cartridge rather than being mounted thereabove as illustrated in FIGS. 1-3. In the embodiment of FIG. 4, the venturi nozzle 190 is provided at its upper end with an outwardly extending annular flange 191 which rests on the horizontal annular shoulder portion 71 of collar 70. Flange 191 has an upwardly extending rim 192 which receives and holds the lowermost ring of the conical compression spring 20.

In FIG. 4, to remove the filter cartridge for replacement or repair, the blow pipe 10 may preferably be removed first, then the assembly comprising the conical compression spring 20 and the venturi nozzle 190 are pulled upwardly and removed, and finally the filter cartridge is removed by pulling upwardly on the collar 70 until the bottom of the filter cartridge clears the gasket cuff 60. To install the filter cartridge, the steps are reversed.

It will be seen that the attachment means shown in FIGS. 1 through 4 support the filter cartridge, comprising the sleeve 40 and the annular pleated filter media 30, in a position below the circular opening 51 in tube sheet 50. The attachment means are secured to the filter cartridge by securing the collar 70, as by glue, to the cap 80, and by securing the cap 80, as by glue, to the filter media 30.

The attachment means shown in FIGS. 1 through 4 are used only for top removal. That is to say, the filter cartridge is removed for replacement or repair by a maintenance man working in the upper clean-air chamber above the tube sheet.

What is claimed is:

1. A dust filter baghouse comprising;
    A. A baghouse tube sheet having a plurality of openings therein;
    B. A plurality of small-diameter filter cartridges, each filter cartridge comprising a cylindrical perforated sleeve, an annular pleated filter media which encircules said sleeve, and a cap secured to the upper end of said filter media,
    C. Attachment structure suspending each of said filter cartridges from said baghouse tube sheet in registry with one of said openings, said attachment structure comprising:
        a. a collar having an annular upper horizontal shoulder portion, an enlarged rim portion, and an annular portion depending downwardly from said rim portion;
        b. means securing said shoulder portion of said collar to said cap;
        c. an annular double-beaded cuff, said cuff having an upper bead, a lower bead and an outer annular groove between said upper and lower beads receiving the edge of one of said openings in the tube sheet, said upper bead of said cuff being positioned to rest on and be supported by said tube sheet, said cuff including spring means so as to be spring biased in an outward direction toward said edge of said opening in said tube sheet; thereby to effect a dust-tight seal between said opening edge and said cuff;
        d. said rim of said collar resting on and be supported by said cuff,
        e. said depending portion of said collar being press fitted into said cuff to effect a dust-tight seal between said depending collar portion and said cuff.

2. The baghouse according to claim 1 wherein said means securing said shoulder portion of said collar to said cap is glue.

3. The baghouse according to claim 2 wherein said cap is secured to said filter cartridge by glue.

* * * * *